United States Patent Office 3,337,625
Patented Aug. 22, 1967

3,337,625
AMINO-ACETYLENIC COMPOUNDS
Nelson R. Easton, Indianapolis, and George F. Hennion, South Bend, Ind., assignors to Eli Lilly and Company, Indianapolis, Ind., a corporation of Indiana
No Drawing. Filed Aug. 28, 1963, Ser. No. 305,205
4 Claims. (Cl. 260—570.5)

This application is a continuation-in-part of our copending application Ser. No. 138,591, filed Sept. 18, 1961 and now abandoned.

This invention relates to a novel group of substituted acetylenes containing two hetero atoms.

The novel compounds provided by this invention can be represented by Formula I below:

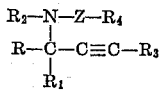

Formula I wherein:

R and $R_1$, when taken separately, represent the same or different members of the group consisting of $C_1$–$C_5$ alkyl, $C_2$–$C_5$ alkenyl, cycloalkyl, cycloalkenyl, lower alkyloxy-substituted lower alkyl, and monocyclic and bicyclic aromatic radicals;

R and $R_1$, when taken together with the carbon atom to which they are attached, represent cycloalkyl or cycloalkenyl;

$R_2$ represents hydrogen, $C_1$–$C_5$ alkyl, $C_3$–$C_5$ alkenyl, cycloalkyl, cycloalkenyl, monocylic and bicyclic aromatic radicals, monocyclic aryl-substituted lower alkyl, hydroxy-substituted lower alkyl, lower alkyloxy-substituted lower alkyl, or monocyclic aryloxy-substituted lower alkyl;

$R_3$ represents hydrogen, $C_1$–$C_5$ alkyl, $C_2$–$C_5$ alkenyl, halogen, monocyclic-aryl-substituted lower alkyl, amino-substituted lower alkyl, and lower alkyloxy-substituted lower alkyl;

$R_4$ represents OH, SH, or NH–$R_2$ wherein $R_2$ has the same meaning as above; and Z represents a two-carbon link such as an alkylene linkage or an arylene linkage in which the amine nitrogen and the radical, $R_4$, occupy adjacent carbon atoms of the aryl ring.

When Z represents an alkylene linkage, the resulting group of compounds coming within the scope of Formula I can be represented by Formula II$_a$ below:

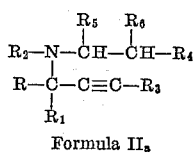

Formula II$_a$ wherein R, $R_1$, $R_2$, $R_3$, and $R_4$ have the same significance as hereinabove, and $R_5$ and $R_6$, when taken separately, represent hydrogen, $C_1$–$C_5$ alkyl, $C_2$–$C_5$ alkenyl, monocyclic and bicyclic aromatic radicals, monocyclic aryl-substituted lower alkyl, cycloalkyl, cycloalkenyl, lower alkyloxy-substituted lower alkyl, and when taken together with the carbon atoms to which they are attached, cycloalkyl or cycloalkenyl.

When Z represents an arylene linkage, the resulting compounds coming within the scope of Formula I can be represented by Formula II$_b$ below using the adjacent atoms of a phenyl ring as exemplary of an arylene linkage:

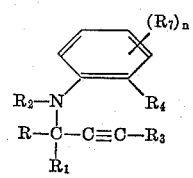

Formula II$_b$ wherein:

R, $R_1$, $R_2$, $R_3$, and $R_4$ have the same significance as hereinabove;

$R_7$ is a member of the group consisting of halo, lower alkyloxy, lower alkyl, lower alkylamino, di-lower alkylamino, lower alkylcarboxamido, arylamino, cyano, nitro, hydroxy, and perhalo-lower alkyl, and n is a number from 0 to 2. When n is 2, $R_7$ can represent the same or different substituents from the above group of substituents.

In Formula I, one or both of the groupings, —$R_2$ and —Z—$R_4$ can represent, in addition to various other radicals, aryl radicals. The compounds produced thereby are α-arylamino-acetylenes in which the α-carbon atom is fully substituted. This type of compound constitutes a novel class of amino-acetylenes and the provision of such compounds forms a second aspect of this invention.

The novel α-arylamino-acetylenes provided by this invention can be represented by Formula II$_c$ below:

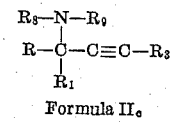

Formula II$_c$ wherein:

R, $R_1$, and $R_3$ have the same meaning as hereinabove;

$R_8$ is a monocyclic or bicylic aryl radical, and;

$R_9$ is a member of the group consisting of hydrogen, $C_1$–$C_5$ alkyl, $C_3$–$C_5$ alkenyl, cycloalkyl, cycloalkenyl, monocyclic aryl, bicyclic aryl, monocyclic aryl-substituted $C_1$–$C_5$ alkyl, lower alkoxy-substituted $C_1$–$C_5$ alkyl, and di-lower alkylamino-substituted $C_1$–$C_5$ alkyl.

In each of the groupings listed above for R, $R_1$, $R_2$, $R_3$, $R_4$, $R_5$, $R_6$, $R_7$, $R_8$, and $R_9$, the term, "lower alkyl" signifies a radical having from 1–3 carbon atoms, such as methyl, ethyl, and isopropyl.

In the above structural formulas, where R, $R_1$, $R_2$, $R_3$, $R_5$, $R_6$, and $R_9$ are alkyl radicals having 1–5 carbon atoms, they can be illustratively methyl, ethyl, isopropyl, n-propyl, sec.-amyl, sec.-butyl, t-butyl, n-amyl, isobutyl, isoamyl, 3-methylbutyl-2, 2-methylbutyl-2, 2-phenyl, 3-pentyl, neopentyl, and the like. When R, $R_1$, $R_2$, $R_3$, $R_5$, $R_6$ and $R_9$ represent alkenyl radicals having from 2–5 or 3–5 carbon atoms, they can be illustratively allyl, methallyl, crotyl, 2-pentenyl-1, 3-pentenyl-2, 4-pentenyl-1, 3-methyl-2-pentenyl-1 and the like.

When R, $R_1$, $R_2$, $R_5$, $R_6$, $R_8$, and $R_9$ represent monocyclic and bicyclic aromatic radicals, they can be illustratively, phenyl, isoquinolinyl, quinolinyl, naphthyl, thienyl, furyl, pyridyl, and pyrimidyl, as well as other radicals which fulfill the usual criteria for aromaticity. In addition, the phrase "monocyclic and bicyclic aromatic radicals" comprehends within its scope substituted radicals in which the substituents can be halogen, hydroxy, mercapto, $C_1$–$C_5$ alkyl, $C_2$–$C_5$ alkenyl, nitro, perhalo-lower alkyl, amino, lower alkyloxy, lower alkylmercapto, lower alkylamino, di-lower alkylamino, and the like. Permissible substituting groups include those listed above for $C_1$–$C_5$ alkyl, $C_2$–$C_5$ alkenyl as well as trifluoromethyl, pentafluoroethyl, di-n-propylamino, trichloromethyl, chloro, bromo, iodo, astatinyl, fluoro, methoxy, ethoxy, isopropoxy, methylmercapto, n-propylmercapto, methylamino, and ethylamino. These substituents can be attached at one or more unoccupied positions in the aromatic ring. Furthermore the term "aromatic" is meant to include compounds according to Formula I, II$_a$, II$_b$ or II$_c$ above in which both R and $R_1$ are aromatic and there is a bridge between the aromatic rings, thus yielding derivatives in which R and $R_1$ plus the carbon to which they are attached form a fluorene or dihydro-anthracene ring or the like with the acetylenic group attached in the 9 position of the fluorene or the 5 position of the dihydro-anthracene ring. Likewise, when both $R_5$ and $R_6$ in Formula II$_a$ are aromatic, a bridge can also be present between the aromatic rings, thus yielding, when $R_5$ and $R_6$ are taken with the carbon atoms to which they are attached, a dihydro-phenanthrene nucleus or the like. All such polycyclic aromatic or partially hydrogenated polycyclic aromatic radicals are deemed to be included within the scope of Formula I.

Illustrative monocyclic and bicyclic aromatic or substituted monocyclic and bicyclic aromatic radicals which R, $R_1$, $R_2$, $R_5$, $R_6$, $R_8$, and $R_9$ represent and thus include naphthyl, phenyl, 2-chlorothienyl, 3-hydroxyfuryl, 2-dimethylaminopyridyl, iodophenyl, bromophenyl, tolyl, allylphenyl, styryl, trifluoromethylphenyl, pentafluoroethylphenyl, trichloromethylphenyl, quinolinyl, isoquinolinyl, 4-lepidyl, quinaldinyl, benzofuryl, mercaptopyrimidyl, picolyl, thianaphthyl, n-hexylphenyl, 5-ethyl-3-aminopyridyl, nitrothienyl, pyridyl, 3-methylfuryl, anisyl, pyrimidyl, hydroxynaphthyl, etc. Each of these aromatic rings can be attached to the particular carbon atoms designated by Formulas I, II$_a$, II$_b$, and II$_c$ above at any unsubstituted position of the aromatic ring itself.

R, $R_1$, $R_2$, $R_5$, $R_6$, and $R_9$, when they represent cycloalkyl radicals or cycloalkenyl radicals, can be illustratively cyclobutyl, cyclopentyl, cyclohexyl, cycloheptyl, cyclooctyl, methylcyclopentyl, cyclopentenyl, cyclohexenyl, cyclooctenyl, and the like with the point of attachment of the group being any available position in the cyclic ring. R and $R_1$, when taken together with the carbon atoms to which they are attached can also represent, illustratively, cycloalkyl or cycloalkenyl groups such as cyclohexyl, cycloheptenyl, cyclobutyl, cyclopropyl, cyclohexenyl, cyclooctyl, cycloheptyl, and the like. The cycloalkyl or cycloalkenyl ring thus formed can also be part of a fused ring system in which the second fused ring can be aromatic, as for example, a tertralin or indane ring, and such rings are included within the scope of the above formulas.

$R_5$ and $R_6$, when taken together with the carbon atoms to which they are attached, can also form a cycloalkyl or cycloalkenyl ring, such rings including cyclobutyl, cyclopentyl, cyclo-octyl, cyclopentenyl, cyclohexyl, cyclohexenyl, cycloheptyl, and the like.

When $R_2$, $R_3$, $R_5$, $R_6$, and $R_9$ represent monocyclic aryl-substituted lower alkyl radicals, they can be, illustratively, benzyl, phenethyl, 2-phenylpropyl, 1-phenylethyl, 1-tolylethyl, m-chlorobenzyl, p-anisidinyl, and the like, the permissible aryl radicals substituted in the alkyl chain being, in general, those defined above for R, $R_1$, $R_2$, $R_5$, $R_6$, $R_8$, and $R_9$. Illustrative halogens which $R_3$ can represent include chlorine and bromine. When R, $R_1$, $R_2$, $R_3$, $R_5$, $R_6$, and $R_9$ represent lower alkyloxyalkyl radicals, they can be illustratively methoxypropyl, ethoxyethyl, iso-propoxyamyl, and the like. $R_2$, when it represents a hydroxy-substituted lower alkyl or a monocyclic aryloxy-substituted lower alkyl, can be illustratively phenoxyethyl, phenoxymethyl, 3-thienyloxypropyl, hydroxyethyl, hydroxypropyl and the like. $R_3$, when it represents amino-substituted lower alkyl, can be, illustratively, 2-dimethylaminoethyl, 2-ethylaminopropyl, 2-amino-2-methylethyl and the like.

$R_7$, which can be an added substituent in an aniline ring already containing an ortho hydroxy, mercapto, amino, or a lower alkylamino substituent, represents a halogen atom such as fluorine, chlorine, bromine, iodine, or the like; a lower alkyloxy group such as methoxy, ethoxy, or n-propoxy; a lower alkyl group such as methyl, ethyl, or n-propyl; a lower alkylamino group of di-lower-alkylamino group such as methylamino, di-methylamino, ethylamino, di-ethylamino, isopropylamino, methyl-n-propylamino, and the like; a lower alkylcarboxamido group such as acetamido, propionamido, or isobutyramido; or a perhalo lower alkyl group such as trifluromethyl, pentafluoroethyl, heptafluropropyl, trichloromethyl and the like.

The above radicals which have been set forth as representative of R, $R_1$, $R_2$, $R_3$, $R_4$, $R_5$, $R_6$, $R_7$, $R_8$ and $R_9$ are illustrative only of the wide range of radicals which these groupings can represent and other radicals which are their equivalent can obviously be used in their stead without departing from the scope of this invention. This is particularly true of the permissible substituents in the various aryl groups of the aryl-containing radicals as defined above.

The compounds of this invention are heavy viscous oils or low-melting solids. Those compounds which contain a basic amine group readily form acid addition salts and these acid addition salts are, in general, white crystalline solids.

The compounds can be prepared by a variety of procedures. For example, all of the compounds represented by the above formulas when $R_3$ is hydrogen can be prepared by reacting a halo-acetylene with an amine in the presence of a metal catalyst according to the procedure set forth in the copending application of Nelson R. Easton and George F. Hennion, Ser. No. 305,197, filed of even date herewith now matured into U.S. Patent 3,285,913 issued Nov. 15, 1966. This procedure is illustrated in Equation 1 below:

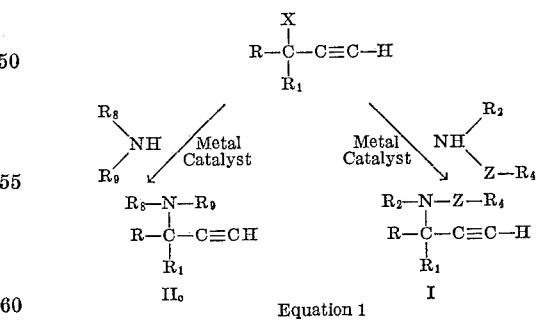

Equation 1

In the above equation, R, $R_1$, $R_2$, $R_4$, $R_8$, $R_9$, and Z have the same meaning as hereinabove and X is halogen.

Compounds represented by Formula I above in which neither R, $R_1$, nor Z contain aromatic linkages can also be prepared directly by the method of Hennion and Nelson, J. Am. Chem. Soc., 79, 2142 (1957). According to this procedure, an acetylenic halide is reacted with a primary or secondary amine to yield the corresponding secondary or tertiary amino-acetylene. Compounds in which either R or $R_1$ or both are aromatic and $R_2$ and Z or $R_9$ are permissibly aromatic can be prepared by the method disclosed in the copending application of Nelson R. Easton and Robert D. Dillard, Ser. No.

The synthetic procedures outlined above which lead directly to the preparation of an acetylenic amine from an amino and a halo-acetylene are carried out on halo-acetylenes in which the group $R_3$ in Formula I is absent, since the amination reaction does not proceed in the absence of a hydrogen attached to the acetylenic grouping. On the other hand, in a reaction such as that represented by Equation 2 above, wherein the acetylenic amine is subjected to further reaction, the $R_3$ group can be present in the starting material, since the absence of the acetylenic hydrogen does not affect the reaction. Thus, the $R_3$ grouping itself must be introduced into a previously formed acetylenic amine. When $R_3$ represents a group other than halogen, the group is customarily introduced by alkylating a metal salt of the acetylene with a suitably substituted alkyl halide. These alkylation procedures are well known to the prior art. If it is desired to alkylate a compound according to Formula I in which $R_3$ is hydrogen, and the $R_4$ grouping is already present, it is usually necessary to protect this latter grouping as by acetylation or by formation of an ether with dihydropyran. This protective grouping prevents reaction of the $R_4$ group with the metal during the formation of the metal acetylide. These protective groups are, of course, readily removed by hydrolytic procedures.

When $R_3$ represents a halogen, this group is introduced into the preformed amino-acetylene by the reactions of a "positive" halogen compounds such as sodium hypochlorite or the like.

The compounds provided by this invention find their chief use as chemical intermediates. Compounds according to Formula I in which $R_4$ is hydroxy, mercapto, amino or monosubstituted amino can be cyclized according to the procedures set forth in the copending applications of Nelson R. Easton and Robert D. Dillard, Ser. Nos. 213,581 and 213,614 filed July 31, 1962, now matured into U.S. Patents 3,225,042 issued Dec. 21, 1965, and 3,192,208 issued June 29, 1965, respectively, and of Nelson R. Easton and Robert D. Dillard, Ser. No. 305,224, filed of even date herewith, to yield substituted morpholines, thiomorpholines, piperazine, and homomorpholines depending both upon the reaction conditions and the substituent groups present in the acetylenic amine starting material represented by Formula I. According to these procedures, when a compound represented by Formula I above wherein $R_3$ is a hydrogen, is heated in the presence of alkali, the reactive grouping $R_4$ adds to the acetylenic bond to give a 6-membered ring compound containing 2-hetero atoms and an exomethylene group, when $R_3$ is a substituent such as an alkyl or substituted alkyl group, the $R_4$ groupings adds to the other end of the acetylenic bond thus yielding a homomorpholine or homothiomorpholine which is partially hydrogenated in that the double bond produced by the addition of the $R_4$ group to the acetylenic triple bond remains in the hetero ring.

Compounds reprsented by Formula II$_c$ above are also useful as intermediates. In particular, those compounds in which the aryl group represented by $R_8$ has no ortho substituent and in which $R_9$ is hydrogen can be cyclized to yield a dihydroquinoline by heating in the presence of a metal catalyst. This reaction is more fully described in the copending application of Nelson R. Easton and George F. Hennion, Ser. No. 305,197, filed this even date now matured into U.S. Patent 3,285,913 issued Nov. 15, 1966.

In specific examples of the use of the compounds of this invention as intermediates, N-phenyl-N-(2'-hydroxyethyl)-3-amino-3-methyl-1-pentyne can be cyclized to yield 1-methylene-2-methyl-2-ethyl-3-phenylmorpholine by the action of base and this compound can, in turn, be hydrated under acidic conditions to yield 1-hydroxymethyl-2-methyl-2-ethyl-3 - phenylmorpholine. Hydration of N-phenyl-N-(2' - hydroxyethyl)-4-amino-4-methyl-2-pentyne yields 4-phenyl-5-ethyl-5-methyl-7-methyl-1,2,3, 4-tetrahydro-1,4-oxasepine also under alkaline conditions. Finally, 3-anilino-3-methyl-1-butyne can be cyclized by heating in the presence of copper-bronze powder to yield 2,2-dimethyl-1,2-dihydroquinoline.

In addition to the above use, certain compounds represented by Formula I, as amply ilustrated above and in the examples which follow, can be alkylated or subjected to hydrogenation or substitution or oxidation procedures to yield other compounds represented by the same formula. Furthermore, the acetylenic bond in the compounds of this invention can be hydrogenated to yield the corresponding ethylene or ethane derivative, or can be hydrated to yield the corresponding α-hydroxyethyl or acetyl derivative. Many of these latter compounds as well as the acetylenic starting materials are useful pharmacologically, for example, as hypotensive agents. Of particular interest is N-ethyl-N-2-(4-methyl-3-chloroanilino)-ethyl-3-amino-3-methyl-1-butyne and compounds related to it which have shown schistosomicidal activity.

Compounds provided by this invention which contain a basic amine function are capable of forming acid addition salts and these acid addition salts are included within the scope of this invention. The preparation of acid addition salts of these amines can be carried out as follows: A solution of the amine is mixed with an equivalent of a solid acid or with a solution containing an equivalent of the acid. If the acid addition salt thus formed is insoluble in the solvent employed, the salt is isolated by filtration or centrifugation. On the other hand, if the acid addition salt is soluble in the solvent employed, the acid addition salt is isolated by evaporation. When an acid addition salt is formed with a gaseous acid such as hydrogen chloride, an excess of the acid can be employed since the excess can be readily removed by volatilization.

The preparation of a typical acid addiiton salt, specifically a hydrochloride salt, is carried out as folows: A solution of the acetylenic amine is prepared in anhydrous ether and an ethereal solution of hydrogen chloride is added thereto, the hydrogen chloride being in a quantity in excess of that needed to react with the number of equivalents of amine present. The amine hydrochlorides are, in general, insoluble in the ethereal solution and are separated by filtration. The acid addition salts are satisfactorily purified by recrystallization from a mixture of anhydrous ethanol and ethyl acetate, although other solvents and solvent mixtures are equally operative.

Other acid addition salts include the sulfates, phosphates, nitrates, hydrobromides, hydriodides, succinates, benzoates, acetates, maleates, tartrates, citrates and the like, and are prepared by following one of the general procedures outlined above.

This invention is further illustrated by the folowing specific examples:

EXAMPLE 1

3-o-aminoanilino-3-methyl-1-butyne

Twenty-seven grams of o-phenylenediamine, 0.5 g. of copper-bronze powder, and 0.5 g. of cuprous chloride were added to 1000 ml. of ether. Twenty-five grams of 3-chloro-3-methyl-1-butyne were added dropwise to this mixture followed by 50.5 g. of triethylamine. After the addition had been completed, the reaction mixture was stirred for about three hours. At the end of this time, 1000 ml. of water were added. The organic layer was separated, was washed twice with 500-ml. portions of water, and was dried. The ether was removed by evaporation in vacuo, and the residue, comprising 3-o-aminoanilino-3-methyl-1-butyne plus some unreacted starting material and some triethylamine, was purified by fractional distillation. 3-o-aminoanilino-3-methyl-1-butyne distilled in the range 84–85° C./0.4 mm. Hg. An infrared spectrum of the material indicated that it had the postulated structure.

*Analysis.*—Calc.: C, 75.82; H, 8.10. Found: C, 75.57; H, 7.92.

138,585, filed Sept. 18, 1961 and now abandoned. According to this procedure, an acetylenic alcohol is reacted with 2 moles of hydrochloric acid to yield a chlorovinyl aralkyl chlorine. This compound then reacts with a primary or secondary amine to yield a chloroethylene aralkylamine. Reaction of this compound with base serves to split out the elements of hydrogen chloride and restores the acetylenic grouping.

An alternative synthetic route for the compound represented by Formula I above wherein Z contains no aromatic unsaturation comprises the reaction of an acetylenic secondary amine produced by any of the above methods with a reactive intermediate such as an oxirane, a thiirane, or an aziridine. This synthetic procedure is illustrated by Equation 2 below:

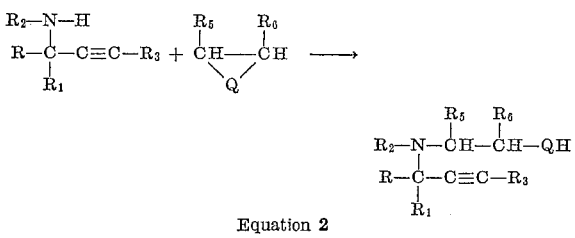

Equation 2 wherein R, $R_1$, $R_2$, $R_3$, $R_5$, and $R_6$ have the same significance as hereinabove and Q is S, O, or $N-R_2$.

The hydroxyethylamines or mercapto-ethylamines or ethylene-diamines thus produced can be further transformed by standard procedures to yield other groupings represented by $R_4$ in Formula I. For example, the hydroxy and mercapto groups can be interchanged by methods well known to the art. Furthermore, the hydroxy group can be replaced by a halogen atom, as for example, by thionyl chloride, thionyl bromide, or phosphorus plus iodine, to yield a halo-ethylamine represented by Formula III below:

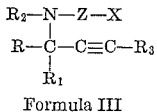

Formula III wherein R, $R_1$, $R_2$, $R_3$, Z and X have the same meaning as hereinabove. The novel reactive intermediates represented by Formula III are useful in that they can be reacted with a primary amine ($NH_2-R_2$) to yield a substituted ethylene-diamine coming within the scope of Formula I.

Yet another alternative method is available for the preparation of certain of the compounds of this invention. According to this procedure, an acetylenic primary or secondary amine, synthesized by either the methods of Hennion and Nelson, of Easton and Hennion, or of Easton and Dillard, cited above or of Hennion and Teach, J. Am. Chem. Soc., 75, 1653 (1953), can be alkylated by standard alkylation procedures with compounds containing an active halogen atom (or its chemical equivalent) corresponding to Formula IV below:

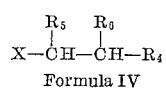

Formula IV wherein $R_4$, $R_5$, $R_6$, and X have the same meaning as hereinabove.

In addition to the reactive halogen-containing intermediates represented by Formula III above, there is another group of reactive intermediates provided by this invention which are useful in that they can be transformed by reductive processes to yield certain of the compounds represented by Formula I above. These novel groups of intermediates can be represented by Formula V below:

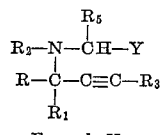

Formula V wherein:

R, $R_1$, $R_2$, $R_3$, and $R_5$ have the same meaning as hereinabove; and

Y is a member of the group consisting of carboxyl, carboxaldehyde, carbo-lower alkoxy, carboxamido, carbimino, (Schiff Base), and acyl. Each of these reactive groups can be transformed by reduction with a metal hydride, such as lithium aluminum hydride or sodium borohydride, to a compound containing a hydroxy group or amine group, according to procedures well known in the art. For example, compounds represented by Formula V containing a carboxyl group

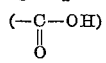

or a carbo-lower alkoxy group

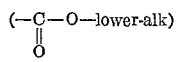

are reduced to a primary alcohol group by the action of a strong reducing agent such as lithium aluminum hydride. The carboxaldehyde group

is likewise reduced to a primary alcohol group, but less stringent reaction conditions are required, since sodium borohydride can be used as the reducing agent. The carboxamido group

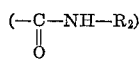

wherein $R_2$ has the same meaning as heretofore, is reduced to a primary or secondary amine by the action of lithium aluminum hydride. The carbimino group

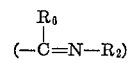

which is prepared by reacting a corboxaldehyde or the carbonyl group of a ketone with an amine to yield a Schiff Base, can be reduced with sodium borohydride to the corresponding primary or secondary amine. When Y in Formula V is an acyl group, the compounds thus represented are ketones and these acyl groups can be represented by the structure,

wherein $R_6$ has the same meaning as hereinabove. These ketones can be reduced to the corresponding secondary alcohol by the action of sodium borohydride. The cyano group is, of course, reduced by lithium aluminum hydride or the like to a primary amine.

In outlining the methods whereby the reactive intermediates of this invention represented by Formula V above can be transformed to compounds represented by Formula I above, a metal hydride reductant has been specified throughout as the reducing agent of choice. It is, of course, theoretically possible to reduce any of the groups represented by Y in Formula V to the corresponding alcohol or amine by means of catalytic hydrogenation, but in a majority of these processes, the acetylenic triple bond is reduced to a greater or lesser degree. As a consequence of the prevalence of this side reaction in catalytic hydrogenation, the use of the metal hydride reducing agent is preferred.

EXAMPLE 2

N-methyl-N-(2'-hydroxyethyl)-3-amino-3-methyl-1-butyne

One hundred and one grams of 3-chloro-3-methyl-1-butyne were added dropwise with stirring to a mixture comprising 260 g. of N-(2'-hydroxyethyl)methylamine, 1 g. of cuprous chloride, and 1 g. of copper-bronze powder in 300 ml. dimethylformamide. After the chloro compound had been added, the reaction mixture was stirred at ambient room temperature for about 5 hours. 500 ml. of water and 50 ml. of 50 percent sodium hydroxide were added and the resulting mixture was extracted with ether. The ether solution containing N-methyl-N-(2'-hydroxyethyl)-3-amino-3-methyl-1-butyne was separated, was washed once with 250 ml. of water, and was dried. The ether was removed by evaporation in vacuo and the compound was distilled. N-methyl-N-(2'-hydroxyethyl)-3-amino-3-methyl-1-butyne boiled in the range 62–76° C./7 mm. Hg $n_D^{25} = 1.469$.

N-methyl - N-(2' - hydroxyethyl)-3-amino-3-methyl-1-butyne hydrochloride was prepared by dissolving the free base in ether and saturating the ether solution with anhydrous gaseous hydrogen chloride. N-methyl-N-(2'-hydroxyethyl)-3-amino - 3 - methyl-1-butyne hydrochloride was insoluble in ether and was separated by filtration. The compound melted at about 88–90° C. after recrystallization from ethyl acetate.

*Analysis.*—Calc.: N, 7.88; Cl, 19.96. Found: N, 7.56; Cl, 20.18.

EXAMPLE 3

3-(2'-aminoethylamino)-3-methyl-1-butyne

Following the procedure of Example 2, 212 g. of 85 percent aqueous ethylenediamine, 1 g. of copper-bronze powder, and 1 g. of cuprous chloride were added to 250 ml. of water. 101 g. of 3-chloro-3-methyl-1-butyne were added to the cooled stirred reaction mixture in dropwise fashion. After the addition had been completed, the reaction mixture was stirred at ambient room temperature for about 48 hours. 3-(2'-aminoethylamino)-3-methyl-1-butyne thus formed was isolated by the procedure of Example 2 and was purified by distillation. The compound boiled in the range 51–52° C./7 mm. Hg $n_D^{25} = 1.561$.

3-(2'-aminoethylamino)-3-methyl-1-butyne hydrochloride was prepared according to the procedure of Example 2 and melted at about 180–182° C. after recrystallization from a mixture of isopropanol and ethanol.

EXAMPLE 4

N-ethyl-N-(2'-hydroxyethyl)-3-amino-3-methyl-1-butyne

Nineteen and seven tenths grams of N-ethyl-N-carbethoxy-methyl-3-amino-3-methyl-1-butyne were dissolved in 50 ml. of anhydrous ether. The ether solution was added in dropwise fashion to a mixture of 11.5 g. of lithium aluminum hydride in 50 ml. of anhydrous ether. After the addition had been completed, the reaction mixture was heated at refluxing temperature for about 14 hours. 12 ml. of water, 9 ml. of 20 percent sodium hydroxide and 23 ml. of water were added successively to the reaction mixture to decompose the organo metallic complexes present. The ether layer containing N-methyl-N-(2'-hydroxyethyl)-3-amino-3-methyl-1-butyne was separated by decantation and was dried. The ether was removed by evaporation in vacuo and the residue comprising N-methyl-N-(2'-hydroxyethyl)-3-amino-3-methyl-1-butyne was purified by distillation. The compound boiled at about 88° C./10 mm. Hg.

*Analysis.*—Calc.: N, 9.02. Found: N, 9.22.

Two grams of N-methyl-N-(2'-hydroxyethyl)-3-amino-3-methyl-1-butyne thus prepared were dissolved in ether and the ether solution was saturated with gaseous hydrogen chloride. N-methyl-N-(2'-hydroxyethyl)-3-amino-3-methyl-1-butyne hydrochloride was insoluble in ether and precipitated. The crystalline precipitate was separated by filtration and was recrystallized from ethyl acetate. N-methyl-N-(2' - hydroxyethyl)-3-amino-3-methyl-1-butyne hydrochloride thus prepared melted at about 95–96° C.

*Analysis.*—Calc.: N, 7.31; Cl, 18.50. Found: N, 7.38; Cl, 18.20.

EXAMPLE 5

Alternate preparation of N-methyl-N-(2'-hydroxyethyl)-3-amino-3-methyl-1-butyne Thirty grams of 3-ethylamino-3-methyl-1-butyne and about 20 g. of ethylene oxide were dissolved in 500 ml. of ethanol. The solution was stirred for about 14 hours and was then heated at refluxing temperature for an additional 2 hours. During this latter period, 5-cc. portions of ethylene oxide were added at one-half hour intervals. The reaction mixture was cooled and a solution of 10 percent ethanolic hydrogen chloride was added until the reaction mixture gave an acidic reaction. The solvents and excess ethylene oxide were removed by distillation in vacuo and the residue comprising N-methyl-N-(2'-hydroxyethyl)-3-amino-3-methyl-1-butyne hydrochloride was dissolved in water. The aqueous solution was made basic with 50 percent sodium hydroxide, thus causing N-methyl-N-(2'-hydroxyethyl)-3-amino-3-methyl-1-butyne to separate. The separated amine base was extracted into ether. The ether extract was separated and was dried. The ether was removed by distillation in vacuo and the residue, comprising N-methyl - N - (2'-hydroxyethyl)-3-amino-3-methyl-1-butyne, was distilled. The compound boiled in the range 88–92° C./10 mm. Hg.

The compound was further purified by redistillation and boiled in the range 89–90° C./10 mm. Hg $n_D^{25} = 1.463$.

Four grams of N-methyl-N-(2'-hydroxyethyl)-3-amino-3-methyl-1-butyne prepared as above were dissolved in ethyl acetate. The resulting solution was saturated with anhydrous gaseous hydrogen chloride, thus forming N-methyl-N-(2' - hydroxyethyl)-3-amino-3-methyl-1-butyne hydrochloride, which melted at about 124–126° C.

EXAMPLE 6

N-ethyl-N-(2'-hydroxypropyl)-3-amino-3methyl-1-butyne

Following the procedure of Example 5, 3-ethylamino-3-methyl-1-butyne was heated at refluxing temperature with an excess of propylene oxide in ethanol. N-ethyl-N-(2'-hydroxypropyl)-3-amino-3-methyl-1-butyne thus prepared was isolated and purified by the procedure of Example 5. It boiled at about 79–80° C./10 mm. Hg $n_D^{25} = 1.451$.

N-ethyl-N-(2'-hydroxypropyl)-3-amino-3-methyl-1-butyne hydrochloride was prepared by the procedure of Example 5 and melted at about 166–168° C.

*Analysis.*—Calc.: N, 6.81; Cl. 17.23. Found: N, 6.75; Cl, 17.67.

EXAMPLE 7

N-t-butyl-N-(2'-hydroxyethyl)-3-amino-3-methyl-1-butyne

Sixty-nine grams of 3-t-butylamino-3-methyl-1-butyne and 24.2 g. of ethylene oxide were dissolved in 400 ml. of ethanol and the ethanol solution was heated in an autoclave in the range 60–70° C. for about 48 hours. N-t-butyl-N-(2'-hydroxyethyl)-3-amino-3-methyl-1-butyne thus prepared was isolated and purified by the procedure of Example 5. N-t-butyl-N-(2' - hydroxyethyl)-3-amino-3-methyl-1-butyne boiled in the range 60–63° C./0.1 mm. Hg.

N-t-butyl-N-(2'-hydroxyethyl)-3-amino - 3 - methyl-1-butyne hydrochloride was prepared by the procedure of Example 5 and was recrystallized from methyl ethyl ketone. N-t-butyl-N-(2'-hydroxyethyl)-3-amino-3-methyl-1-butyne hydrochloride melted at about 120–121° C.

*Analysis.*—Calc.: C, 60.12; H, 10.09; N, 6.37. Found: C, 60.30; H, 10.25; N, 6.46.

EXAMPLE 8

3-(2'-hydroxyethylamino)-3-isopropyl-4-methyl-1-pentyne 3-(2'-hydroxyethylamino) - 3 - isopropyl-4-methyl-1-pentyne was prepared by the procedure of Example 7 and was isolated and purified by the procedure of Example 5. 3-(2'-hydroxyethylamino) - 3 - isopropyl-4-methyl-1-pentyne thus prepared boiled at about 118° C./10 mm. Hg. 3 - (2'-hydroxyethylamino)-3-isopropyl-4-methyl-1-pentyne hydrochloride prepared by the procedure of Example 5 melted at about 113–116° C.

*Analysis.*—Calc.: C, 60.12; H, 10.09. Found: C, 59.90; H, 10.24.

EXAMPLE 9

N-ethyl-N-(2'-ethylaminoethyl)-3-amino-3-methyl-1-butyne

Twenty-two grams of 70 percent aqueous ethylamine were placed in a reaction flask, 12 g. of N-ethyl-N-(2'-chloroethyl)-3-amino-3-methyl-1-butyne were added, and the mixture was heated to refluxing temperature for about 14 hours. N-ethyl-N-(2'-ethyl-aminoethyl)-3-amino-3-methyl-1-butyne thus prepared was purified by the procedure of Example 5. The free base boiled at about 85° C./10 mm. Hg.

N-ethyl-N-(2'-ethylaminoethyl)-3-amino - 3-methyl-1-butyne dihydrochloride was prepared by the procedure of Example 5 and melted at about 199–201° C. after recrystallization from ethanol.

*Analysis.*—Calc.: C, 51.76; H, 9.48. Found: C, 51.87; H, 9.52.

EXAMPLE 10

N-ethyl-N-(2'-phenyl-2'-hydroxyethyl)-3-amino-3-methyl-1-butyne

Following the procedure of Example 5, 83.25 g. of 3-ethylamino-3-methyl-1-butyne and 100 g. of styrene oxide were dissolved in 500 ml. of methanol, and the solution was heated at refluxing temperature for about 2 days. N - ethyl - N - (2' - phenyl-2'-hydroxyethyl)-3-amino-3-methyl-1-butyne thus prepared was separated and purified by the procedure of Example 5. The compound boiled at about 100° C./0.1 mm. Hg $n_D^{25}$=1.517.

N-ethyl-N-(2'-phenyl-2'-hydroxyethyl) - 3 - amino - 3-amino-3-methyl-1-butyne hydrochloride was prepared by the method of Example 5 (ethyl acetate) and melted at about 158–160° C. after recrystallization from methyl ethyl ketone.

*Analysis.*—Calc.: C, 67.27; H, 8.28. Found: C, 67.63; H, 8.03.

EXAMPLE 11

N-ethyl-N-(2'-phenyl-2'-hydroxyethyl)-1-amino-1-ethynylcyclohexane

Following the procedure of Example 5, 1-ethylamino-1-ethynylcyclohexane and ethylene oxide were reacted to form N - ethyl-N-(2'-hydroxyethyl)-1-amino-1-ethynyl-cyclohexane, which boiled at about 80° C./0.1 mm. Hg.

N-ethyl-N-(2'-hydroxyethyl)-1-amino-1 - ethynylcyclohexane free base prepared as above was dissolved in a mixture of ethyl acetate and methyl ethyl ketone. An excess of ethanolic hydrogen chloride was added, thus forming N-ethyl-N-(2'-hydroxyethyl)-1-amino-1-ethynyl-cyclohexane hydrochloride, which melted at about 147–149° C.

*Analysis.*—Calc.: C, 62.19; H, 9.57. Found: C, 62.44; H, 9.46.

EXAMPLE 12

N-ethyl-N-(2'-hydroxy-1'-methylethyl)-3-amino-3-methyl-1-butyne

Following the procedure of Example 4, N-ethyl-N-(1'-carbethoxyethyl)-3-methyl-3-amino-1-butyne was reduced with lithium aluminum hydride to produce N-ethyl-N-(2' - hydroxy - 1' - methylethyl) - 3-amino-3-methyl-1-butyne, which distilled in the range 70–73° C./7 mm. Hg $n_D^{25}$=1.460.

N-ethyl-N-(2'-hydroxy-1'-methylethyl) - 3 - amino - 3-methyl-1-butyne hydrochloride was prepared by the procedure of Example 5 and melted at about 148–150° C. after recrystallization from a mixture of methyl ethyl ketone and isopropyl alcohol.

*Aanalysis.*— Calc.: C, 58.38; H, 9.80. Found: C, 58.43; H, 9.75.

EXAMPLE 13

N-methyl-N-(2'-phenyl-2'-hydroxyethyl)-3-amino-3-methyl-1-butyne

Following the procedure of Example 5, styrene oxide and 3-methylamino-3-methyl-1-butyne were reacted in methanolic solution to yield N-methyl-N-(2'-phenyl-2'-hydroxyethyl)-3-amino-3-methyl-1-butyne which distilled in the range of 84–85° C./0.1 mm. Hg.

N-methyl-N-(2' - phenyl - 2'-hydroxyethyl)-3-amino-3-methyl-1-butyne hydrochloride was prepared by the procedure of Example 5 and melted at about 121–123° C. after recrystallization from ethyl acetate.

*Analysis.*—Calc.: C, 66.26; H, 7.94. Found: C, 66.53; H, 8.18.

EXAMPLE 14

N-ethyl-N-(2'-p-tolyl-2'-hydroxyethyl)-3-amino-3-methyl-1-butyne

Sixty-seven grams of p-methylacetophenone were dissolved in 200 ml. of glacial acetic acid, and 25 ml. of bromine were added with stirring while the reaction temperature was kept below 30° C. After the addition had been completed, the reaction mixture was cooled to about 0° C. and 100 g. of ice were added. The reaction mixture was kept at about 0° C. for about 3 hours, during which time ω-bromo-p-methylacetophenone precipitated. To 70 g. of ω-bromo-p-methylacetophenone dissolved in 500 ml. of acetonitrile there were added 83.5 g. of 3-ethyl-amino-3-methyl-1-butyne, and the reaction mixture was stirred for about 3 days. Three hundred milliliters of methanol were added and the reaction mixture was made acidic by the addition of ethanolic hydrochloric acid. N-ethyl - N - p - methylbenzoylmethyl-3-amino-3-methyl-1-butyne thus prepared was purified by the procedure of Example 7.

Thirty-five grams of N-ethyl-N-p-methylbenzoylmethyl-3-amino-3-methyl-1-butyne were dissolved in 500 ml. of ethanol. 11.2 g. of sodium borohydride were added and the reaction mixture was stirred at ambient room temperature for about 14 hours. 500 ml. of water were added and the resulting mixture was extracted with one liter of ether. The ether extract was separated and was washed with one liter of water. The ether solution containing N-ethyl - N-(2'-p-tolyl-2'-hydroxyethyl)-3-amino-3-methyl-1-butyne thus prepared was dried over anhydrous magnesium sulfate and the drying agent was separated by filtration. The ether solution was concentrated by evaporation in vacuo and was cooled, thus yielding N-ethyl-N-(2'-p-tolyl-2'-hydroxyethyl)-3-amino-3-methyl-1 - butyne as a white precipitate melting at about 90–91° C.

N - ethyl - N - (2'-p-tolyl-2'-hydroxyethyl)-3-amino-3-methyl-1-butyne hydrochloride was prepared by the method of Example 5 and melted at about 147–149° C. after recrystallization from ethyl acetate.

*Analysis.*—Calc.: C, 68.19; H, 8.58. Found: C, 68.06; H, 8.39.

N - ethyl - N - (2'-p-anisyl-2'-hydroxyethyl)-3-amino-3-methyl-1-butyne was prepared by the above procedure by substituting p-methoxyacetophenone for p-methylacetophenone as a starting material. The resulting product melted at about 76–78° C. after recrystallization from ether.

The corresponding hydrochloride salt melted at about 138–140° C. after recrystallization from ethyl acetate.

*Analysis.*—Calc.: C, 64.52; H, 8.12. Found: C, 64.42; H, 7.97.

N - ethyl - N - (2'-o-chlorophenyl-2'-hydroxyethyl) - 3-amino-1-methylbutyne was prepared by the above procedure except that o-chloracetophenone was substituted for p-methylacetophenone as a starting material. The free base distilled in the range 100–105° C./0.04 mm. Hg.

The corresponding hydrochloride salt melted at about 163–165° C. after two recrystallizations from ethyl acetate.

*Analysis.*—Calc.: C, 59.60; H, 7.00. Found: C, 59.74; H, 6.92.

N - ethyl - N - (2'-p - chlorophenyl-2'-hydroxyethyl)-3-amino-3-methyl-1-butyne was prepared by the above procedure except that ω-bromo-p-chloracetophenone was used in place of ω-bromo-p-methylacetophenone. The free base was a solid melting at about 80–82° C. after recrystallization from methylcyclohexane.

The corresponding hydrochloride salt melted at about 156–158° C. after recrystallization from a mixture of methyl ethyl ketone and ethyl acetate.

*Analysis.*—Calc.: C, 59.60; H, 7.00. Found: C, 59.89; H, 7.06.

EXAMPLE 15

3-(2'-hydroxy-2'-phenylethylamino)-3-methyl-1-butyne

Following the procedure of Example 5, 21 g. of 3-amino-3-methyl-1-butyne and 30 g. of styrene oxide were dissolved in 500 ml. of ethanol and the solution was heated to refluxing temperature for about 6 hours. 3-(2'-hydroxy-2'-phenylethylamino)-3-methyl-1-butyne thus formed was recovered by the procedure of Example 5. The ether solution containing 3-(2'-hydroxy-2'-phenylethylamino)-3-methyl-1-butyne was concentrated by evaporation and was cooled, yielding a crystalline precipitate of 3 - (2' - hydroxy - 2' - phenylethylamino) - 3 - methyl-1-butyne which melted at about 90–93° C.

3-(2'-hydroxy-2'-phenylethylamino)-3-methyl-1-butyne hydrochloride, prepared by the procedure of Example 5, melted at about 135–137° C. after recrystallization from a mixture of ethyl acetate and methylcyclohexane.

*Analysis.*—Calc.: C, 65.12; H, 7.57. Found: C, 64.95; H, 7.73.

EXAMPLE 16

N-ethyl-N-(2'-hydroxyethyl)-3-phenyl-3-amino-1-butyne

Thirty-four and eight tenths grams of 3-ethylamino-3-phenyl-1-butyne and 13.2 g. of ethylene oxide were dissolved in 300 ml. of methyl alcohol and the solution was heated in the range 60–70° C. in an autoclave for about 14 hours. The solvent was removed by evaporation in vacuo and the residue, comprising N-ethyl-N-(2'-hydroxyethyl)-3-phenyl-3-amino-1-butyne formed in the above reaction, was purified by distillation. The compound boiled in the range 90–91° C./0.01 mm. Hg $n_D^{25}=1.529$.

*Analysis.*—Calc.: C, 77.38; H, 8.81. Found: C, 77.33; H, 8.77.

EXAMPLE 17

N-ethyl-N-(2'-o-anisidinoethyl)-3-amino-3-methyl-1-butyne

Following the procedure of Example 9, N-ethyl-N-(2'-chloroethyl)-3-amino-3-methyl-1-butyne and o-anisidine were dissolved in one liter of anhydrous benzene and the solution was heated at refluxing temperature for about 2 days. The reaction mixture was cooled and N-ethyl-N-(2' - o - anisidinoethyl) - 3 - amino - 3 - methyl - 1 - butyne thus formed was isolated and purified by the procedure of Example 5. The product distilled in the range 100–300° C./0.1–0.2 mm. Hg.

N - ethyl - N - (2' - o - anisidinoethyl) - 3 - amino - 3-methyl-1-butyne monohydrochloride was prepared by the method of Example 5 and melted at about 159–160° C. after being recrystallized first from methyl ethyl ketone and then from isopropyl alcohol.

*Analysis.*—Calc.: Cl, 11.90. Found: Cl, 11.40.

EXAMPLE 18

N-ethyl-N-(2'-t-butylaminoethyl)-3-amino-3-methyl-1-butyne

Following the procedure of Example 9, t-butylamino was reacted with N-ethyl-N-(2'-chloroethyl)-3-amino-3-methyl-1-butyne in aqueous solution. N-ethyl-N-(2'-t-butylaminoethyl)-3-amino-3-methyl-1-butyne thus formed was recovered and purified by the procedure of Example 5. The free base boiled at about 84° C./7 mm. Hg $n_D^{25}=1.449$.

*Analysis.*—Calc.: N, 13.32. Found: N, 13.15.

N - ethyl - N - (2' - t - butylaminoethyl) - 3 - amino-3-methyl-1-butyne hydrochloride was prepared by the method of Example 5 and melted at about 193–195° C. after recrystallization from isopropanol.

*Analysis.*—Calc.: C, 55.12; H, 9.96. Found: C, 55.12; H, 9.94.

EXAMPLE 19

N-ethyl-N-(2'-phenyl-2'ethylaminoethyl)-3-amino-3-methyl-1-butyne

Following the procedure of Example 9, N-ethyl-N-(2'-phenyl - 2' - chloroethyl) - 3 - amino - 3 - methyl - 1-butyne and ethylamine were reacted by warming in acetonitrile solution at about 50° C. for 14 hours, after which time all voltatile constituents were removed by evaporation in vacuo. The residue was made basic by the addition of an excess of 10 percent aqueous sodium hydroxide. N - ethyl - N - (2' - phenyl - 2' - ethylaminoethyl) - 3-amino-3-methyl-1-butyne was thus all converted to the free base, which was extracted into ether. The ether extract was separated and was dried and the ether was removed therefrom by evaporation in vacuo. Distillation of the residue yielded N-ethyl-N-(2'-phenyl-2'-ethylaminoethyl)-3-amino-3-methyl-1-butyne boiling at about 83° C./0.01 mm. Hg $n_D^{25}=1.502$.

N - ethyl - N - (2' - phenyl - 2' - ethylaminoethyl) - 3-amino-3-methyl-1-butyne hydrochloride was prepared by the method of Example 5 and melted at about 170–172° C. after recrystallization from methyl ethyl ketone.

*Analysis.*—Calc.: C, 61.62; H, 8.52. Found: C, 61.60; H, 8.42.

EXAMPLE 20

N-ethyl-N-(3'-diethylamino-2'-hydroxypropyl)-3-amino-3-methyl-1-butyne

Twenty-five grams of 3-methylamino-3-methyl-1-butyne and 75 g. of N,N-diethylglycidylamine were mixed and heated at 100° C. for 14 hours with stirring. The reaction mixture was distilled under reduced pressure. N-ethyl - N - (3' - diethylamino - 2' - hydroxypropyl) - 3-amino-3-methyl-1-butyne thus prepared boiled in the range 112–115° C./5 mm. Hg.

N - ethyl - N - (3' - diethylamino - 2' - hydroxypropyl)-3-amino-3-methyl-1-butyne dihydrochloride was prepared by the procedure of Example 4 and melted at about 195–196° C.

*Analysis.*—Calc.: C, 52.19; H, 9.43; N, 9.37. Found: C, 52.19; H, 9.35; N, 9.14.

EXAMPLE 21

N-ethyl-N-(2',3'-dihydroxypropyl)-3-amino-3-methyl-1-butyne

Following the procedure of Example 5, 100 g. of 3-ethyl-amino-3-methyl-1-butyne and 66 g. of glycidyl alcohol were dissolved in 200 ml. of methanol and the solution was heated at refluxing temperature while being stirred for about 24 hours. The reaction mixture was subjected to fractional distillation in vacuo. N-ethyl-N-

(2',3' - dihydroxypropyl) - 3 - amino - 3 - methyl - 1-butyne constituted the fraction boiling in the range 100–105° C./1.0 mm. Hg $n_D^{25}=1.476$.

N - ethyl - N - (2',3' - dihydroxypropyl) - 3 - amino-3-methyl-1-butyne hydrochloride was prepared by the method of Example 4 and melted at about 127–128° C. after recrystallization from methyl ethyl ketone followed by a vacuum sublimation.

*Analysis.*—Calc.: C, 54.17; H, 9.09, N, 5.32. Found: C, 54.34; H, 8.79; N, 6.33.

EXAMPLE 22

*N-ethyl-N-(3'-isopropoxy-2'-hydroxypropyl)-3-amino-3-methyl-1-butyne*

The procedure of Example 21 was repeated except that the epoxide employed was isopropyl glycidyl ether. N - ethyl - N - (3' - isopropoxy - 2' - hydroxypropyl) - 3-amino-3-methyl-1-butyne thus prepared boiled at about 135° C./10 mm. Hg.

N - ethyl - N - (3' - isopropoxy - 2' - hydroxypropyl) - 3-amino-3-methyl-1-butyne hydrochloride was prepared by the method of Example 4 and melted at about 108–109° C. after recrystallization from a mixture of ether and ethanol.

*Analysis.*—Calcd.: C, 59.18; H, 9.94; N, 5.30. Found: C, 59.01; H, 10.26; N, 5.23.

EXAMPLE 23

*N-ethyl-N-(3'-allyloxy-2'-hydroxypropyl)-3-amino-3-methyl-1-butyne*

The procedure of Example 21 was followed except that allyl glycidyl ether was used in place of glycidyl alcohol. N - ethyl - N - (3' - allyloxy - 2' - hydroxypropyl) - 3-amino-3-methyl-1-butyne thus obtained boiled at about 110° C./5 mm. Hg.

N - ethyl - N - (3' - allyloxy - 2' - hydroxypropyl) - 3-amino-3-methyl-1-butyne hydrochloride was prepared by the method of Example 4 and melted at about 96–97° C. after recrystallization from isopropanol.

*Analysis.*—Calc.: C, 59.64; H, 9.24; N, 5.35. Found: C, 59.65; H, 9.58; N, 5.22.

EXAMPLE 24

*N-ethyl-N-(3'-phenoxy-2'-hydroxypropyl)-3-amino-3-methyl-1-butyne*

The procedure of Example 21 was followed except that phenyl glycidyl ether was used in place of glycidyl alcohol. N - ethyl - N - (3' - phenoxy - 2' - hydroxypropyl) - 3-amino-3-methyl-1-butyne thus prepared boiled at about 135° C./1 mm. Hg $n_D^{25}=1.515$.

N - ethyl - N - (3' - phenoxy - 2' - hydroxypropyl) - 3-amino-3-methyl-1-butyne hydrochloride was prepared by the method of Example 4 and melted at about 121–122° C.

*Analysis.*—Calcd.: C, 64.74; H, 8.15; N, 4.72. Found: C, 64.93; H, 8.26; N, 4.78.

EXAMPLE 25

*N-allyl-N-(2'-hydroxyethyl)-3-amino-3-methyl-1-butyne*

Following the procedure of Example 7, 3-allylamino-3-methyl-1-butyne and ethylene oxide were reacted in methanol solution in an autoclave. Distillation of the reaction mixture yielded N-allyl-N-(2'-hydroxyethyl)-3-amino-3-methyl-1-butyne boiling in the range 86–88° C./5 mm. Hg.

N - allyl - N - (2' - hydroxyethyl) - 3 - amino - 3 - methyl-1-butyne hydrochloride was prepared by the method of Example 4, and melted at about 119–120° C.

*Analysis.*—Calc.: C, 58.96; H, 8.91. Found: C, 58.87; H, 8.77.

EXAMPLE 26

*N-cyclohexyl-N-(2'-hydroxyethyl)-3-amino-3-methyl-1-butyne*

Following the procedure of Example 7, 3-cyclohexylamino-3-methyl-1-butyne and ethylene oxide were dissolved in methanol and the solution was heated in an autoclave at about 70° C. for about 24 hours. The reaction mixture was subjected to distillation. N-cyclohexyl-N - (2' - hydroxyethyl) - 3 - amino - 3 - methyl - 1-butyne constituted the fraction distilling at about 100° C./0.02 mm. Hg.

N - cyclohexyl - N - (2' - hydroxyethyl) - 3 - amino-3-methyl-1-butyne hydrochloride was prepared by the method of Example 4 and melted at about 195–196° C. after recrystallization from methyl ethyl ketone.

*Analysis.*—Calc.: C, 63.52; H, 9.64; N, 5.70. Found: C, 63.59; H, 9.61; N, 5.72.

EXAMPLE 27

*N-β-phenethyl-N-(2'-hydroxyethyl)-3-amino-3-methyl-1-butyne*

Three hundred fifty grams of β-phenethylamine and 102 g. of 3-chloro-3-methyl-1-butyne were mixed and the mixture was allowed to remain at room temperature for about 72 hours. An excess of 10 percent aqueous sodium hydroxide was added to the reaction mixture and the 3-β-phenethylamino-3-methyl-1-butyne formed in the reaction, being insoluble in the aqueous alkaline layer, separated and was extracted into ether. The ether extract was separated and dried, and the ether was removed therefrom by evaporation in vacuo. 3-β-phenethylamino-3-methyl-1-butyne thus obtained was purified by distillation and boiled in the range 53–58° C./0.1 mm. Hg $n_D^{25}=1.508$.

*Analysis.*—Calc.: C, 83.37; H, 9.15; N, 7.48. Found: C, 83.54; H, 9.01; N, 7.29.

Following the procedure of Example 7, 3-β-phenethylamino-3-methyl-1-butyne and ethylene oxide were dissolved in methanol and the solution was heated in an autoclave for about 24 hours. N-β-phenethyl-N-(2'-hydroxyethyl)-3-amino-3-methyl-1-butyne thus formed was purified by distillation. It boiled in the range 218–220° C./0.1 mm. Hg.

N - β - phenethyl - N - (2' - hydroxyethyl) - 3 - amino-3-methyl-1-butyne hydrochloride was prepared by the method of Example 4 and melted at about 160–161° C. after recrystallization from methyl ethyl ketone.

*Analysis.*—Calc.: C, 67.27; H, 8.28; N, 5.23. Found: C, 67.27; H, 8.48; N, 4.92.

EXAMPLE 28

*N-p-tolyl-N-(2'-hydroxyethyl)-3-amino-3-methyl-1-butyne*

Following the procedure of Example 7, 3-p-toluidino-3-methyl-1-butyne and ethylene oxide were dissolved in methanol and the solution was heated in an autoclave for about 24 hours. The reaction mixture was subjected to distillation in vacuo and N-p-tolyl-N-(2'-hydroxyethyl)-3-amino-3-methyl-1-butyne distilled at about 96–98° C./0.1 mm. Hg.

N - p - tolyl - N - (2' - hydroxyethyl) - 3 - amino - 3-methyl-1-butyne hydrochloride was prepared by the method of Example 4 and melted at about 105–107° C.

*Analysis.*—Calc.: C, 66.26; H, 7.94; N, 5.52. Found: C, 65.98; H, 7.85; N, 5.26.

EXAMPLE 29

*N-m-chlorophenyl-N-(2'-hydroxyethyl)-3-amino-3-methyl-1-butyne*

Following the procedure of Example 5, a methanolic solution of ethylene oxide and 3-m-chloranilino-3-methyl-1-butyne was heated at refluxing temperature for about 24 hours. The reaction mixture was subjected to distillation in vacuo and N-m-chlorophenyl-N-(2'-hydroxyethyl)-3-amino-3-methyl-1-butyne distilled at 140° C./1.0 mm. Hg.

Analysis.—Calcd. for $C_{13}H_{16}NOCl$: C, 65.70; H, 6.79; N, 5.90. Found: C, 65.79; H, 6.89; N, 6.09.

EXAMPLE 30

*N-methyl-N-(2'-hydroxy-3'-butenyl)-3-amino-3-methyl-1-butyne*

Following the procedure of Example 5, butadiene monoxide and 3-methylamino-3-methyl-1-butyne were refluxed in methanolic solution for about 24 hours. Distillation of the reaction mixture in vacuo yielded N-methyl-N-(2'-hydroxy-3'-butenyl)-3-amino-3-methyl - 1 - butyne distilling in the range 65–68° C./5 mm. Hg.

N-methyl-N-(2'-hydroxy - 3' - butenyl) - 3 - amino - 3-methyl-1-butyne hydrochloride was prepared by the method of Example 4 and melted at about 108–109° C. after two-fold recrystallization from an ethanolic ethyl acetate solvent mixture.

Analysis.—Calc.: C, 58.97; H, 8.90; N, 6.88. Found: C, 58.98; H, 8.75; N, 6.64.

EXAMPLE 31

*N-ethyl-N-(2'-p-toluidinoethyl)-3-amino-3-methyl-1-butyne*

Following the procedure of Example 9, N-ethyl-N-(2'-chloroethyl)-3-amino-3-methyl-1-butyne and p-toluidine were reacted in aqueous solution. N-ethyl-N-(2'-p-toluidinoethyl)-3-amino-3-methyl-1-butyne thus prepared was purified by making the reaction mixture basic with 10 percent aqueous sodium hydroxide and extracting the desired free base into ether. The ether extract was separated and dried, and the ether was removed by evaporation in vacuo. Distillation of the residue yielded purified N-ethyl-N-(2'-p-toluidinoethyl)-3-amino - 3 - methyl - 1 - butyne boiling at about 148–149° C./0.1 mm. of Hg.

N - ethyl - N - (2' - p - toluidinoethyl) - 3 - amino-3-methyl-1-butyne hydrochloride was prepared by the procedure of Example 4 and melted at about 166–167° C.

Analysis.—Calc.: C, 60.75; H, 8.21; N, 8.90. Found: C, 60.82; H, 8.43; N, 9.12.

N - ethyl - N - [2' - (m - chloro - p - toluidino)ethyl]-3-amino-3-methyl-1-butyne was prepared by the above procedure by employing m-chloro-p-toluidine in place of p-toluidine. The product boiled in the range 139–147° C./ 0.1 mm. Hg and its hydrochloride salt melted at about 161–162° C. The hydrochloride salt gave the following:

Analysis.—Calc.: C, 54.53; H, 7.16; N, 7.96. Found: C, 54.38; H, 7.16; N, 7.82.

N-ethyl-N-(2'-allylaminoethyl) - 3 - amino - 3 - methyl-1-butyne was prepared by the above procedure except that allylamine was substituted for p-toluidine. The free base was purified by distillation and converted into the hydrochloride salt, which melted at about 172–173° C. and had the following:

Analysis.—Calc.: C, 55.93; H, 9.05; N, 10.48. Found: C, 53.63; H, 9.16; N, 10.56.

N-ethyl-N-(2'-cyclohexylaminoethyl) - 3 - amino - 3-methyl-1-butyne was prepared by the above procedure except that cyclohexylamine was substituted for p-toluidine. The free base was purified by distillation and boiled at about 112–115° C./0.5 mm. Hg upon redistillation.

N-ethyl-N-(2' - cyclohexylaminoethyl) - 3 - amino - 3-methyl-1-butyne dihydrobromide was prepared by saturating an ethereal solution of the free base with gaseous anhydrous hydrogen bromide, collecting the precipitate by filtration, and recrystallizing the precipitate from a mixture of methyl ethyl ketone and isopropyl alcohol. The dihydrobromide melted at about 176–177° C.

Analysis.—Calc.: C, 45.24; H, 7.59; N, 7.04. Found: C, 45.40; H, 7.77; N, 7.16.

N-ethyl-N-(2' - p - dimethylaminoanilinoethyl) - 3-amino-3-methyl-1-butyne was prepared by the above procedure except that p-dimethylaminoaniline was substituted for p-toluidine and acetonitrile was employed as the solvent. The free base was purified by distillation and boiled in the range 156–160° C./0.1 mm. Hg.

Analysis.—Calc.: C, 74.68; H, 9.95; N, 15.37. Found: C, 74.62; H, 9.78; N, 15.30.

The trihydrochloride salt of the free base was prepared but proved to be hygroscopic, and neither a satisfactory analysis nor a reliable melting point could be obtained.

EXAMPLE 32

*N,N-bis-(2'-hydroxyethyl)-3-amino-3-methyl-1-butyne*

Following the procedure of Example 7, 3-(2'-hydroxyethylamino)-3-methyl-1-butyne and ethylene oxide were dissolved in methanol and the solution was heated at 70° C. in an autoclave for about 24 hours. N,N-bis-(2'-hydroxyethyl)-3-amino-3-methyl - 1 - butyne thus prepared was recovered and purified by the procedure of Example 5. N,N-bis-(2'-hydroxyethyl)-3-amino-3-methyl - 1 - butyne free base distilled at about 132° C./5 mm. Hg, $n_D^{25}=1.481$.

N,N - bis - (2' - hydroxyethyl)-3-amino-3-methyl-1-butyne hydrochloride was prepared by the method of Example 5 and melted in the range 82–84° C. after recrystallization from a mixture of methyl ethyl ketone and ethyl acetate.

Analysis.—Calc.: C, 52.04; H, 8.74. Found: C, 52.18; H, 8.85.

EXAMPLE 33

*N-o-anisyl-N-(2'-hydroxyethyl)-3-amino-3-methyl-1-butyne*

Following the procedure of Example 7, 3-o-anisidino-3-methyl-1-butyne and ethylene oxide were dissolved in methanol and the methanol solution was heated at about 60° C. in an autoclave for about 48 hours. The reaction mixture was subjected to distillation in vacuo. N-o-anisyl-N-(2' - hydroxyethyl)-3-amino-3-methyl - 1 - butyne distilled in the range 87–95° C./0.06 mm. Hg. Redistillation of this fraction yielded purified N-o-anisyl-N- (2'-hydroxyethyl)-3-amino-3-methyl-1-butyne boiling in the range 92–95° C./0.08 mm. Hg $n_D^{25}=1.523$.

N - o - anisyl - N-(2'-hydroxyethyl)-3-amino-3-methyl-1-butyne hydrochloride was prepared by the procedure of Example 4 and melted at about 105–106° C. after a two-fold recrystallization from a mixture of isopropanol and ethyl acetate.

Analysis.—Calc.: C, 62.33; H, 7.47. Found: C, 62.74; H, 7.65.

EXAMPLE 34

*N-p-dimethylaminophenyl-N-(2'-hydroxypropyl)-3-amino-3-methyl-1-butyne*

Fifty grams of 3-p-dimethylaminoanilino-3-methyl-1-butyne hydrochloride, 100 g. of propylene oxide, and 50 g. of triethylamine were dissolved in methanol and refluxed about 16 hours. The solution was then poured into 500 ml. of water and the mixture extracted with ether; the ether solution was dried over magnesium sulfate and the solvent evaporated in vacuo. The residue was distilled at reduced pressure. The N-p-dimethylaminophenyl-N-(2'-hydroxypropyl)-3-amino-3-methyl-1-butyne thus obtained distilled in the range 148–150° C./5 mm. Hg.

Analysis.—Calc.: C, 73.80; H, 9.29; N, 10.76. Found: C, 73.70; H, 9.25; N, 10.82.

EXAMPLE 35

*N-ethyl-N-(2'-mercaptoethyl)-3-amino-3-methyl-1-butyne*

A mixture of 31.6 g. (0.17 mole) of N-ethyl-3-β-chlorethylamino-3-methyl - 1 - butyne hydrochloride and 13.7 g. (0.18 mole) of thiourea in 500 ml. of methanol was refluxed for 16 hours. The methanol was distilled in vacuo and the residue was dissolved in water. To the aqueous solution there were added 6.8 g. (0.17 mole) of sodium hydroxide dissolved in 50 ml. of water. The mixture was extracted with chloroform, the chloroform solution dried over magnesium sulfate, and the solvent distilled in vacuo. The residue consisted largely of the isothiuronium salt. This material was dissolved in water and made basic with a 50 percent solution of sodium hydroxide and allowed to stand for 4 hours. The solution was made acidic with hydrochloric acid and then neutralized with sodium bicarbonate. The mixture was extracted with ether, the ether layer dried over magnesium sulfate, and filtered. Dry hydrogen chloride was bubbled into the ethereal solution and a precipitate of N-ethyl-N-(2'-mercaptoethyl)-3-amino - 3 - methyl-1-butyne hydrochloride formed. The compound thus obtained was a waxy solid with no sharp melting point.

*Analysis.*—Calc.: C, 49.59; H, 8.32. Found: C, 49.85; H, 8.13.

EXAMPLE 36

*N-methyl-N-(2'-hydroxyethyl)-3-amino-3-methyl-1-chloro-1-butyne*

One hundred and six grams of N-methyl-N-(2'-hydroxyethyl)-3-amino-3-methyl-1-butyne were dissolved in 500 ml. of methanol. Anhydrous gaseous hydrogen chloride was passed into the methanolic solution until it gave an acidic reaction to litmus. The ethanol was removed by evaporation in vacuo and the residue, comprising N-methyl-N-(2' - hydroxyethyl)-3-amino-3-methyl-1-butyne hydrochloride, was dissolved in 300 ml. of chloroform. 126 g. of dihydropyran were added dropwise to the stirred reaction mixture. An additional 100 ml. of chloroform were then added and the resulting mixture was stirred for about 90 minutes. 1.5 mole of sodium hydroxide were added in the form of a 10 percent aqueous solution. The chloroform solution containing the pyranyl ether of N-methyl-N-(2' - hydroxyethyl)-3-amino-3-methyl-1-butyne formed in the above reaction was separated and dried. Distillation of the chloroform layer yielded the pyranyl ether of N-methyl-N-(2'-hydroxyethyl) - 3 - amino-3-methyl-1-butyne which boiled about 62–65° C./0.05 mm. Hg $n_D^{25}$=1.464.

Two and fifty-three hundredths grams of sodium were added to 500 ml. of liquid ammonia and the resulting mixture was stirred for about one hour. 20.1 g. of the above pyranyl ether were dissolved in 150 ml. of diethyl ether and the solution was added to the liquid ammonia mixture. The reaction mixture was stirred for about one hour, after which time 300 ml. of additional ether were added. The reaction mixture was heated gently to remove the excess ammonia by evaporation. A solution of 21 g. of p-tosyl chloride dissolved in 100 ml. of ether was added dropwise with stirring to the reaction mixture. 500 ml. of water were then added and the ether layer was separated and was washed with dilute hydrochloric acid. The aqueous layer and acid wash were combined and made basic with 50 percent aqueous sodium hydroxide, thus providing N-methyl-N-(2' - hydroxyethyl)-3-amino-3-methyl-1-chloro-1-butyne in the form of the free base. The free base was extracted into ether, the ether extract was separated and dried, and the ether was removed by evaporation in vacuo. The residue, comprising N-methyl-N-(2'-hydroxyethyl)-3-amino-3-methyl-1-chloro-1-butyne, was again dissolved in an excess of dilute hydrochloric acid and stirred for one hour, the aqueous acidic layer was made basic, and the insoluble amine free base was extracted with ether. The ether layer was separated and dried and the ether removed therefrom by evaporation in vacuo. Distillation of the residue yielded N-methyl-N-(2'-hydroxyethyl)-3-amino-3-methyl-1-chloro-1-butyne boiling in the range 76–80° C./4 mm. Hg.

EXAMPLE 37

*N-methyl-N-(2'-hydroxyethyl)-4-amino-4-methyl-2-pentyne*

Following the procedure of Example 36, the pyranyl ether of N-methyl-N-(2'-hydroxyethyl)-3-amino-3-methyl-1-butyne was reacted with sodamide in liquid ammonia, thus forming the sodium salt of the pyranyl ether. Methyl iodide was then added to the reaction mixture, thus forming the pyranyl ether of N-methyl-N-(2'-hydroxyethyl) - 4-amino-4-methyl-2-pentyne. The shielding pyranyl group was removed and N-methyl-N-(2'-hydroxyethyl)-4-amino-4-methyl-2-pentyne isolated and purified by the procedure of Example 36. N-methyl-N-(2'-hydroxyethyl)-4-amino - 4 - methyl-2-pentyne thus prepared distilled in the range 73–76° C./4 mm. Hg.

N-methyl-N-(2'-hydroxyethyl)-4-amino - 4 - methyl-2-pentyne hydrochloride was prepared by the method of Example 5 and melted at about 78–82° C. after recrystallization from ethyl acetate.

*Analysis.*—Calc.: C, 56.38; H, 9.46. Found: C, 56.37; H, 9.54.

N-methyl-N-(2'-hydroxyethyl)-4-amino - 4 - methyl-1-phenyl-2-pentyne was prepared by the above procedure by substituting benzyl bromide for methyl iodide.

EXAMPLE 38

*N-methyl-N-(2'-hydroxyethyl)-6-amino-6-methyl-4-heptyne-1-ene*

Following the procedure of Example 36, the sodium salt of the pyranyl ether of N-methyl-N-(2'-hydroxyethyl)-3-amino-3-methyl-1-butyne was converted to the sodium salts and reacted with allyl bromide. After recovery and purification according to the procedure of Example 36, N-methyl-N-(2' - hydroxyethyl)-6-amino-6-methyl-4-heptyne-1-ene boiled at about 94–100° C./4 mm. Hg.

EXAMPLE 39

*3-anilino-3-methyl-1-butyne*

A mixture was prepared containing 27.9 g. of aniline, 40.5 g. of triethylamine, 100 ml. of ether, 25 ml. of water, 0.3 g. of cuprous chloride, and 0.3 g. of copper-bronze powder in a 3-neck flask equipped with a mechanical stirrer and dropping funnel. Twenty-five and five tenths grams of 3-chloro-3-methyl-1-butyne dissolved in 25 ml. of ether were added dropwise with stirring in an atmosphere of nitrogen while maintaining the reaction temperature in the range 16–20° C. by means of external cooling. After the addition had been completed, the reaction mixture was stirred for two additional hours at room temperature. The reaction mixture was poured into a beaker containing 100 ml. of ether and 50 ml. of 10 percent aqueous sodium hydroxide. The ethereal layer was separated and was contacted with 400 ml. of aqueous hydrochloric acid. 3-anilino-3-methyl-1-butyne passed into the aqueous layer in the form of the hydrochloride salt. The acidic aqueous layer was then made basic with 40 ml. of sodium hydroxide thus forming 3-anilino-3-methyl-1-butyne free base which, being insoluble in the alkaline layer, was extracted with 100 ml. of ether. The ethereal layer was separated and dried. The ether was removed by evaporation in vacuo, and the residue, comprising 3-anilino-3-methyl-1-butyne formed in the above reaction, was purified by distillation. Twenty-three and five-tenths grams (59 percent yield) of 3-anilino-3-methyl-1-butyne boiling in the range 76–78° C./0.2 mm. Hg were obtained.

Table I which follows lists other acetylenic amines prepared by the process of this invention.

TABLE I

| Name of Compound | B.P. °C. | B.P. Mm. Hg | $n_D^{25}$ | Yield Percent |
|---|---|---|---|---|
| 3-anilino-3-methyl-1-pentyne | 96 | 1 | | 58 |
| 3-anilino-3-ethyl-1-pentyne | 101 | 1 | 1.5372 | 46 |
| 1-anilino-1-ethynylcyclohexane | | | | 60 |
| 3-o-chloranilino-3-methyl-1-butyne | 54.9 | 0.04 | 1.5465 | 61 |
| 3-m-chloranilino-3-methyl-1-butyne | 68.9 | 0.1 | 1.5537 | 55 |
| 3-p-toluidino-3-methyl-1-butyne | 50–51 | 0.08 | | |
| 3-m-nitroanilino-3-methyl-1-butyne | 130 | 95 | | |

EXAMPLE 40

*3-p-chloranilino-3-methyl-1-butyne*

A reaction mixture was prepared from 127.5 g. of p-chloraniline, 0.5 g. of cuprous chloride, 0.5 g. of copper-bronze powder, 101 g. of triethylamine, and 40 ml. of ether. One hundred and three grams of 3-chloro-3-methyl-1-butyne were added dropwise to the stirred reaction mixture. After the addition had been completed, the reaction mixture was stirred for an additional two hours, and 3-p-chloranilino-3-methyl-1-butyne formed in the above reaction was isolated by the procedure of Example 1. The compound boiled at about 98–99° C./0.4 mm. Hg $n_D^{25}$=1.554.

EXAMPLE 41

*3-m-nitroanilino-3-methyl-1-butyne*

Following the procedure of Example 39, m-nitroaniline was reacted with 3-chloro-3-methyl-1-butyne in the presence of copper-bronze powder and triethylamine to yield 3-m-nitroanilino-3-methyl-1-butyne, which was isolated and purified by the procedure of Example 39. 3-m-nitroanilino-3-methyl-1-butyne distilled at about 130° C./5 mm. Hg.

*Analysis.*—Calc.: C, 64.69; H, 5.92; N, 13.72. Found: C, 64.60; H, 5.69; N, 13.52.

EXAMPLE 42

*3-p-ethoxyanilino-3-methyl-1-butyne*

A reaction mixture was prepared containing 137 g. of phenetidine, 500 ml. of triethylamine, and 1.0 g. of silver chloride. The reaction mixture was heated to reflux and 100 g. of 3-chloro-3-methyl-1-butyne were added thereto in dropwise fashion with stirring over a two hour period. After the addition had been completed, the reaction mixture was cooled to ambient room temperature and then stirred at that temperature for 15 hours. Five hundred grams each of water and ether were added and the ether layer was separated. The ether layer was extracted with 12 N aqueous hydrochloric acid. The acidic solution was washed with ether, the ether wash being discarded. The acidic solution was then made basic by the addition of 45 percent aqueous sodium hydroxide, thus causing 3-p-ethoxyanilino-3-methyl-1-butyne formed in the above reaction to separate as an oil. The oil was taken up in ether, the ether solution was separated and dried, and the ether was removed by evaporation in vacuo. The residue comprising 3-p-ethoxyanilino-3-methyl-1-butyne was purified by distillation. The compound boiled at about 140–146° C./5 mm. Hg. The corresponding hydrochloride salt was prepared by the method of Example 5 and melted at about 163–164° C. after recrystallization from ethyl acetate. The salt had the following:

*Analysis.*—Calc.: C, 53.14; H, 7.57; N, 5.84. Found: C, 65.42; H, 7.70; N, 5.76.

Following the same procedure, 4-aminopyridine was reacted with 3-chloro-3-methyl-1-butyne to yield N-(4-pyridyl) 3-amino-3-methyl-1-butyne. The compound was a solid and was purified by chromatography over Grade III (Woelm activated alumina, using a 20 percent chloroform, 80 percent benzene solution as the eluant. Evaporation of the eluting solution yielded purified 4-(4-pyridyl) 3-amino-3-methyl-1-butyne melting at about 117–118° C.

Other hydrochloride salts of α-amino-acetylenes prepared by the procedure of Example 5 are listed in Table II which follows:

TABLE II

| Name of Compound | Melting Point, °C. | Carbon, Percent Calcd. | Carbon, Percent Obsd. | Hydrogen, Percent Calcd. | Hydrogen, Percent Obsd. | Nitrogen, Percent Calcd. | Nitrogen, Percent Obsd. |
|---|---|---|---|---|---|---|---|
| 3-anilino-3-methyl-1-butyne hydrochloride | 169–70 | 67.51 | 67.15 | 7.21 | 7.18 | | |
| N-methyl-N-phenyl-3-amino-3-methyl-1-butyne hydrochloride | 149–50 | 68.72 | 69.16 | 7.69 | 7.72 | 6.68 | 6.61 |
| 3-p-methoxyanilino-3-methyl-1-butyne hydrochloride | 169–70 | 63.85 | 64.22 | 7.15 | 7.17 | 6.20 | 6.22 |
| 3-anilino-3-ethyl-1-pentyne hydrochloride | 156–57 | 69.78 | 69.99 | 8.11 | 8.05 | 6.26 | 6.39 |
| 1-anilino-1-ethynylcyclohexane hydrochloride | 199–200 | 71.32 | 71.04 | 7.69 | 7.41 | 5.94 | 6.08 |
| 3-m-chloranilino-3-methyl-1-butyne hydrochloride | 157–158 | 57.41 | 57.63 | 5.69 | 5.93 | 6.07 | 5.95 |
| 3-m-chloro-p-methylanilino)-3-methyl-1-butyne hydrochloride | 150–150.5 | 59.03 | 59.31 | 6.19 | 6.36 | 5.74 | 5.92 |
| 3-o-aminoanilino-3-methyl-1-butyne hydrochloride | 52–54 | 75.82 | 75.57 | 8.10 | 7.92 | | |
| 3-allylamino-3-methyl-1-butyne hydrochloride | 187–188 | 60.18 | 60.45 | 8.84 | 9.05 | | |

Further illustrative acetylenic compounds which can be prepared by the procedure of the above examples include the following:

4-(2'-mercapto-ethylamino)-4-cyclohexyl-2-octyne
3-(2'-carboxy-2'-hydroxyethylamino)-3-(2-cyclopentenyl)-1-hexyne
3-(3'-carbethoxy-3'-hydroxy-2'-propylamino)-3-methylhex-5-en-1-yne
4-N-methyl-N-(2'-aminocyclohexyl)-3-amino-3-isopropyl-1-heptyne
3-(2'-phenyl-2'-hydroxyethylamino)-3-methyl-1-pentyne
9-ethynyl-9-(piperazinyl)fluorene
and the like.

The following synthetic procedures illustrate the preparation of intermediates which are useful in the synthesis of compounds represented by Formula I above.

PREPARATION 1

*N-ethyl-N-(2'-phenyl-2'-chlorethyl)-3-amino-3-methyl-1-butyne*

Forty-five grams of N-ethyl-N-(2'-phenyl-2'-hydroxyethyl)-3-amino-3-methyl-1-butyne and 100 ml. of thionyl chloride were dissolved in 500 ml. of benzene and the reaction mixture was heated at refluxing temperature for about 14 hours. The volatile constituents were evaporated in vacuo and the residue, comprising N-ethyl-N-(2'-phenyl - 2'-chlorethyl)-3-amino-3-methyl-1-butyne hydrochloride, was dissolved in water and the aqueous solution was made basic by the addition of excess 50 percent sodium hydroxide solution. N-ethyl-N-(2'-phenyl-2'-chlorethyl)-3-amino-3-methyl-1-butyne was insoluble in the aqueous alkaline layer and was extracted into ether. The ether solution was separated and dried, and the ether was removed by evaporation in vacuo, leaving as a residue N - ethyl - N-(2'-phenyl-2'-chlorethyl)-3-amino-3-methyl-1-butyne.

PREPARATION 2

*N-ethyl-N-(2'-chlorethyl)-3-amino-3-methyl-1-butyne*

Following the method of Preparation 1, N-ethyl-N-(2'-hydroxyethyl) - 3 - amino-3-methyl-1-butyne and thionyl chloride were reacted in benzene solution to form N-ethyl-N-(2'-chlorethyl)-3-amino-3-methyl-1-butyne which was purified by the method of Preparation 1. N-ethyl-N-(2'-chlorethyl)-3-amino-3-methyl-1-butyne was purified by distillation, and was found to boil at about 65° C./10 mm. Hg.

PREPARATION 3

*N-ethyl-N-(carbethoxymethyl)-3-amino-3-methyl-1-butyne*

A mixture of 80 g. of 3-ethylamino-3-methyl-1-butyne and 134 g. of ethyl bromoacetate in one liter of acetonitrile was refluxed for two days. The mixture was cooled and a 10 percent solution of hydrogen chloride in ethanol was added until the mixture was acidic. The volatile components were distilled in vacuo. The residue was dissolved in water and the water solution was washed with ether. The water layer was made basic with sodium hydroxide and extracted with ether. The ether layer was dried and the ether distilled in vacuo. The N-ethyl-N-(carbethoxymethyl)-3-amino-3-methyl-1-butyne boiled at about 98° C./10 mm. Hg.

*Analysis.*—Calc.: C, 66.97; H, 9.71. Found: C, 66.87; H, 9.92.

Using the above procedure, N-ethyl-N-(1'-carbethoxyethyl)-3-amino-3-methyl-1-butyne was prepared, boiling at about 42–52° C./0.1 mm. Hg.

We claim:
1. The nitrogenous bases having the following formula, or the acid addition salts thereof:

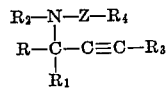

wherein
R and $R_1$, when taken separately, are members of the group consisting of $C_1$–$C_5$ alkyl, $C_2$–$C_5$ alkenyl, $C_4$–$C_8$ cycloalkyl, $C_5$–$C_8$ cycloalkenyl, mono-lower alkyloxy-substituted lower alkyl, and aromatic radicals of the group consisting of phenyl and pyridyl, said aromatic radicals containing no more than two substituents, said substituents being members of the group consisting of halo, hydroxy, amino, dimethyl-amino, $C_1$–$C_6$ alkyl, $C_2$–$C_3$ alkenyl, perhalo lower alkyl, nitro, methoxy, and mercapto;

R and $R_1$, when taken together with the carbon atom to which they are attached, are a member of the group consisting of $C_3$–$C_8$ cycloalkyl and $C_5$–$C_8$ cycloalkenyl;

$R_2$ is a member of the group consisting of hydrogen, $C_1$–$C_5$ alkyl, $C_3$–$C_5$ alkenyl, $C_4$–$C_8$ cycloalkyl, $C_5$–$C_8$ cycloalkenyl, mono-phenyl-substituted lower alkyl, mono - hydroxy - substituted lower alkyl, mono-lower alkyloxy-substituted lower alkyl, mono-phenoxy-substituted lower alkyl, and aromatic radicals of the group consisting of phenyl and pyridyl, said aromatic radicals containing no more than two substituents, said substituents being members of the group consisting of halo, hydroxy, amino, dimethylamino, $C_1$–$C_5$ alkyl, $C_2$–$C_3$ alkenyl, perhalo lower alkyl, nitro, methoxy, and mercapto;

$R_3$ is a member of the group consisting of hydrogen, $C_1$–$C_5$ alkyl, $C_2$–$C_5$ alkenyl, halogen, mono-phenyl-substituted lower alkyl, mono-amino-substituted lower alkyl, and mono-lower alkyloxy-substituted lower alkyl;

$R_4$ is a member of the group consisting of SH and HN-$R_2$; and

Z is a member of the group consisting of a two-carbon alkylene linkage and a two-carbon portion of an arylene ring, the amine nitrogen and $R_4$ occupying adjacent carbon atoms.

2. The nitrogenous bases having the following formula, or the acid addition salts thereof:

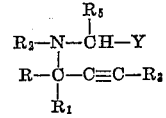

wherein R and $R_1$, when taken separately, are members of the group consisting of $C_1$–$C_5$ alkyl, $C_2$–$C_5$ alkenyl, $C_4$–$C_8$ cycloalkyl, $C_5$–$C_8$ cycloalkenyl, mono-lower alkyloxy-substituted lower alkyl, and aromatic radicals of the group consisting of phenyl and pyridyl, said aromatic radicals containing no more than two substituents, said substituents being members of the group consisting of halo, hydroxy, amino, dimethyl-amino, $C_1$–$C_5$ alkyl, $C_2$–$C_3$ alkenyl, perhalo lower alkyl, nitro, methoxy, and mercapto;

R and $R_1$, when taken together with the carbon atom to which they are attached, are a member of the group consisting of $C_3$–$C_8$ cycloalkyl and $C_5$–$C_8$ cycloalkenyl;

$R_2$ is a member of the group consisting of hydrogen, $C_1$–$C_5$ alkyl, $C_3$–$C_5$ alkenyl, $C_4$–$C_8$ cycloalkyl, $C_5$–$C_8$ cycloalkenyl, mono-phenyl-substituted lower alkyl, mono-hydroxy-substituted lower alkyl, mono-lower alkyloxy-substituted lower alkyl, mono-phenoxy-substituted lower alkyl, and aromatic radicals of the group consisting of phenyl and pyridyl, said aromatic radicals containing no more than two substituents, said substituents being members of the group consisting of halo, hydroxy, amino, dimethylamino, $C_1$–$C_5$ alkyl, $C_2$–$C_3$ alkenyl, perhalo lower alkyl, nitro, methoxy, and mercapto;

$R_3$ is a member of the group consisting of hydrogen, $C_1$–$C_5$ alkyl, $C_2$–$C_5$ alkenyl, halogen, mono-phenyl-substituted lower alkyl, mono-amino-substituted lower alkyl, and mono-lower alkyloxy-substituted lower alkyl;

Y is a member of the group consisting of —COOH, —COO-lower alkyl, —CO—NHR$_2$, and —CO—R$_6$; and $R_5$ and $R_6$, when taken separately, are members of the group consisting of hydrogen, $C_1$–$C_5$ alkyl, $C_2$–$C_5$ alkenyl, $C_4$–$C_8$ cycloalkyl, $C_5$–$C_8$ cycloalkenyl, mono-lower alkyloxy-substituted lower alkyl, and aromatic radicals of the group consisting of phenyl and pyridyl, said aromatic radicals containing no more than two substituents, said substituents being members of the group consisting of halo, hydroxy, amino, dimethyl-amino, $C_1$–$C_5$ alkyl, $C_2$–$C_5$ alkenyl, perhalo lower alkyl, nitro, methoxy, and mercapto; and $R_5$ and $R_6$, when taken together with the carbon atoms to which they are attached, are a member of the group consisting of $C_4$–$C_8$ cycloalkyl and $C_5$–$C_6$ cycloalkenyl.

3. N - ethyl - N-[2'-(4-methyl-3-chloroanilino)ethyl] 3-amino-3-methyl-1-butyne.

4. 3-m-nitroanilino-3-methyl-1-butyne.

(References on following page)

References Cited

UNITED STATES PATENTS

| | | | |
|---|---|---|---|
| 2,342,493 | 2/1944 | Reppe et al. | 260—577 |
| 2,613,208 | 10/1952 | Van Hook et al. | 260—570.9 X |
| 2,974,140 | 3/1961 | Croxall et al. | |
| 3,106,553 | 10/1963 | Dawson | 260—570.5 X |

OTHER REFERENCES

Wolf: "Ann." vol. 576, pp. 35—45 (1952).

Wolf et al.: "Ann." vol. 626, pp. 47–60 (1959) (page 48 relied on).

CHARLES B. PARKER, *Primary Examiner.*

ROBERT V. HINES, *Assistant Examiner.*